(12) United States Patent
Vikberg et al.

(10) Patent No.: US 8,275,376 B2
(45) Date of Patent: Sep. 25, 2012

(54) HANDOVER BETWEEN A CELLULAR NETWORK AND AN UNLICENSED-RADIO ACCESS NETWORK USING A SINGLE IDENTIFIER FOR ALL THE ACCESS POINTS

(75) Inventors: Jari Vikberg, Järna (SE); Tomas Nylander, Värmdö (SE); Magnus Hallenstål, Täby (SE); Thomas Christer Bertil Walldeen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 266 days.

(21) Appl. No.: 10/588,658

(22) PCT Filed: Feb. 6, 2004

(86) PCT No.: PCT/EP2004/001115
§ 371 (c)(1),
(2), (4) Date: Jun. 12, 2007

(87) PCT Pub. No.: WO2005/076648
PCT Pub. Date: Aug. 18, 2005

(65) Prior Publication Data
US 2007/0281696 A1 Dec. 6, 2007

(51) Int. Cl.
*H04W 36/00* (2009.01)

(52) U.S. Cl. ........ 455/436; 455/433; 455/444; 455/445; 455/422.1; 455/435.1; 370/328; 370/329; 370/338; 370/331

(58) Field of Classification Search ....... 455/432.1–453, 455/464, 509, 555; 370/329, 331, 341, 338
See application file for complete search history.

(56) References Cited

U.S. PATENT DOCUMENTS

| | | | | |
|---|---|---|---|---|
| 5,485,163 A | * | 1/1996 | Singer et al. | 342/457 |
| 5,519,706 A | * | 5/1996 | Bantz et al. | 455/435.2 |
| 5,794,149 A | * | 8/1998 | Hoo | 455/438 |

(Continued)

FOREIGN PATENT DOCUMENTS

EP 1 207 708 A1 5/2002
(Continued)

OTHER PUBLICATIONS

Notice of Allowance mailed Oct. 13, 2011 in related U.S. Appl. No. 10/591,953 (8 pages).
(Continued)

*Primary Examiner* — Jean Gelin
*Assistant Examiner* — Babar Sarwar
(74) *Attorney, Agent, or Firm* — Nixon & Vanderhye P.C.

(57) ABSTRACT

In cellular mobile networks handover between base stations of adjacent cells requires the identity, address and frequency of all adjacent cells to be known to other elements of the network. Conventional networks can be extended by the addition of unlicensed-radio access networks. These include an access network controller (303) preferably connected via a broadband network (302) to a plurality of low-power local base stations (301), which communicate with mobile stations (1) over an unlicensed radio interface. The number and changing location of the local base station renders the operation and maintenance required to enable handover from the conventional network to these access networks prohibitively complex. This difficulty is alleviated by assigning the whole access network a single identifier. With this arrangement regardless of which base station mini-cell (304) an active call is being handed-over to, the conventional network will be able to route the request to the access network controller.

19 Claims, 3 Drawing Sheets

U.S. PATENT DOCUMENTS

| | | | |
|---|---|---|---|
| 6,061,337 A * | 5/2000 | Light et al. | 370/331 |
| 6,144,709 A * | 11/2000 | Piirainen et al. | 375/343 |
| 6,477,382 B1 * | 11/2002 | Mansfield et al. | 455/458 |
| 6,487,410 B1 * | 11/2002 | Kontio et al. | 455/437 |
| 7,127,250 B2 | 10/2006 | Gallagher et al. | |
| 2002/0019880 A1 | 2/2002 | Sakakura | |
| 2002/0058504 A1 | 5/2002 | Stanforth | |
| 2002/0077097 A1 | 6/2002 | Mizell et al. | |
| 2002/0197984 A1 * | 12/2002 | Monin et al. | 455/419 |
| 2003/0176186 A1 | 9/2003 | Mohammed | |
| 2004/0146021 A1 | 7/2004 | Fors et al. | |
| 2004/0208151 A1 | 10/2004 | Haverinen et al. | |
| 2004/0209615 A1 | 10/2004 | Lamb et al. | |
| 2005/0075112 A1 | 4/2005 | Ball et al. | |
| 2006/0019656 A1 | 1/2006 | Gallagher et al. | |
| 2007/0184824 A1 | 8/2007 | Nylander | |
| 2007/0264996 A1 | 11/2007 | Vikberg et al. | |
| 2007/0291750 A1 | 12/2007 | Nylander et al. | |
| 2008/0119187 A1 * | 5/2008 | Gallagher et al. | 455/436 |
| 2008/0242298 A1 | 10/2008 | Nylander et al. | |
| 2009/0303909 A1 | 12/2009 | Farhoudi et al. | |

FOREIGN PATENT DOCUMENTS

| | | |
|---|---|---|
| EP | 1 271 852 A2 | 1/2003 |
| EP | 1 351 530 A1 | 10/2003 |
| EP | 1351530 A1 * | 10/2003 |
| EP | 1 441 556 A | 7/2004 |
| GB | 2 313 257 A | 11/1997 |
| WO | 99/01002 A2 | 1/1999 |
| WO | 99/48312 A | 9/1999 |
| WO | 00/07402 A1 | 2/2000 |
| WO | 03/079706 A1 | 9/2003 |
| WO | 03/101128 A | 12/2003 |
| WO | 2004/002051 A | 12/2003 |
| WO | 2004/068768 | 8/2004 |

OTHER PUBLICATIONS

Office Action mailed Jun. 14, 2011 in related U.S. Appl. No. 10/591,953 (12 pages).
Office Action mailed Aug. 29, 2011 in related U.S. Appl. No. 10/592,317 (11 pages).
Office Action mailed Mar. 21, 2011 in related U.S. Appl. No. 10/592,317 (5 pages).
Notice of Allowance mailed Dec. 9, 2010 in related U.S. Appl. No. 10/589,873 (10 pages).
International Search Report of PCT/EP2004/001539, mailed Dec. 10, 2004.
Office Action mailed Jun. 22, 2010 in related U.S. Appl. No. 10/589,873 (9 pages).
International Search Report of PCT/EP2004/002357, mailed Nov. 9, 2004.
Office Action mailed Apr. 9, 2008 in related U.S. Appl. No. 10/591,953 (12 pages).
Office Action mailed Sep. 16, 2008 in related U.S. Appl. No. 10/591,953 (14 pages).
Office Action mailed May 27, 2009 in related U.S. Appl. No. 10/591,953 (10 pages).
Office Action mailed Feb. 4, 2010 in related U.S. Appl. No. 10/591,953 (12 pages).
International Search Report of PCT/EP2004/002414, mailed Nov. 25, 2004.
Mahmood et al., "An Architecture for Integrating CDMA and 802.11 WLAN Networks", Vehicular Technology Conference, 2003, VTC 2003-FALL, 2003 IEEE 58$^{th}$ Orlando FL, Oct. 6-9, 2003, pp. 2073-2077, XP010701282.
U.S. Appl. No. 10/589,873, filed Jun. 13, 2007; Inventor: Nylander et al.
U.S. Appl. No. 10/591,953, filed Sep. 8, 2006; Inventor: Nylander et al.
U.S. Appl. No. 11/547,013, filed Oct. 2, 2006; Inventor: Vikberg et al.
U.S. Appl. No. 10/592,317, filed Sep. 11, 2006; Inventor: Nylander et al.
Office Action mailed Aug. 3, 2010 in co-pending U.S. Appl. No. 11/547,013 (16 pages).
International Search Report of PCT/EP2004/003367 mailed Nov. 25, 2004.
Office Action mailed Sep. 23, 2010 in related U.S. Appl. No. 10/592,317 (14 pages).
Office Action mailed Apr. 12, 2012 in related U.S. Appl. No. 10/592,317 (7 pages).

* cited by examiner

HANDOVER BETWEEN A CELLULAR NETWORK AND AN UNLICENSED-RADIO ACCESS NETWORK USING A SINGLE IDENTIFIER FOR ALL THE ACCESS POINTS

This application is the US national phase of international application PCT/EP2005/001115 filed 6 Feb. 2005, the entire content is hereby incorporated by reference.

FIELD

The present disclosure concerns mobile communication combining both public mobile access networks and unlicensed access networks. The disclosure has specific relevance to the transfer of connections between public mobile networks and unlicensed-radio access networks.

BACKGROUND ART

In any mobile communication system, such as a GSM network active calls conducted between a mobile station and a base station need to be handed over to a different base station as the mobile station moves between different coverage areas, or cells. Depending on how each cell is defined, handover may require the active call to be re-routed simply through a different base station transceiver BTS, through a different base station controller BSC or through a different mobile services switching center MSC. Handover may also be necessary when capacity problems are met in any one cell.

Handover necessitates a certain amount of operation and maintenance, such as defining neighbouring cells, as well as the base station controller BSC and mobile services switching center MSC that controls the cell, defining which cell frequencies should be measured and what threshold value to use to initiate handover. In a conventional GSM network the base station controller BSC sends a mobile station a list of frequencies to be measured. Two lists may be sent out, a first list being used for idle mode, such as when the mobile station is roaming, and a second used for active mode when a call is ongoing. This second list defines which frequencies the mobile station should measure and report back on. These lists contain a set of values that refer to absolute radio frequency channel numbers ARFCN of neighbouring cells. In addition to these frequency channel numbers the base station controller BSC also knows base station identity codes BSIC of all neighbouring cells. The mobile station measures the frequencies defined by these channel numbers and reports these measurements to the base station controller. In practice, the mobile station will report on only the six best measurement values and only for those cell frequencies on which that the mobile station can synchronise and consequently receive an identity code relating to the base station (BSIC). The measurement report sent back to the base station controller BSC by the mobile station MS includes a reference to the absolute radio frequency channel numbers ARFCN, the base station identity codes (BSIC) and an indication of the uplink signal strength. In fact the report does not specify the exact absolute radio frequency channel numbers ARFCN but rather refers to the position this number occupied in the measurement list. On the basis of this report, the base station controller BSC decides whether handover is necessary and to which cell. The initiation of handover is performed according to the standard GSM mechanism for each vendor. Specifically, a message is sent by the base station controller to the mobile services switching center MSC connected to the base station controller BSC indicating that handover is required. This message contains a cell identifier, the cell global identifier CGI, which defines the mobile country code, mobile network code and location area code for the cell to which handover is requested. The cell global identifier CGI is fetched by the base station controller from a list using the base station identification code BSIC and absolute radio frequency channel number ARFCN obtained for the cell. With this cell global identification CGI the mobile services switching center MSC is able to determine which other MSC handles the cell defined by the CGI value.

Recently proposals have been made to extend conventional cellular networks by including access networks that utilise a low power unlicensed-radio interface to communicate with mobile stations. The access networks are designed to be used together with the core elements of a standard public mobile network. The access network is constructed so that the core elements, such as the mobile switching centers MSC, of the public mobile network views the unlicensed-radio access network as a conventional base station controller BSC. Such an access network and the mobile station for use with this access network is described in European patent application No. EP-A-1 207 708. The content of this application is incorporated herein by reference. The low power and, resultant low range of the unlicensed-radio interface means that several such access networks may be provided in relatively close proximity, for example one access network per floor of an office building. The access network preferably also includes a fixed broadband network which connects to a mobile services switching centre (MSC) of a conventional GSM public mobile network. This greatly facilitates the installation of the access network, permitting a subscriber to install the access network in his own home himself, for example. Suitable unlicensed-radio formats include digital enhanced cordless telecommunications (DECT), wireless LAN and Bluetooth. An adapted mobile handset capable of operating over both the standard air interface (e.g. the Um interface) and the unlicensed-radio interface means that the subscriber requires only one phone for all environments.

The problem when including one or more unlicensed-radio access networks in a conventional public licensed mobile network such as a GSM, UMTS or CDMA2000 network is that handover from the public licensed mobile network to the unlicensed-radio access network greatly increases the necessary operational and maintenance measures required in some cases to unacceptably high levels. Depending on the number of unlicensed-radio access networks present, the number of access points could amount to thousands or tens of thousands. Defining these access points in the relevant elements of the public licensed mobile network would be a time-consuming and costly task. In addition, several unlicensed-radio access points may be located in the same public licensed mobile network cell. It may thus not be possible for the base station controller to compile a list of all possible frequencies that require measurement within the cell in addition to those of the cells adjacent the public licensed mobile network. In addition the ease of installation of the individual access points of an unlicensed-radio access network means that the number and location of these access points could be constantly changing. Each change would require the public licensed mobile network to be updated on the new location of the access points.

SUMMARY

It is thus an object to propose a system of handling handover from a conventional public licensed mobile network, such as GSM, UTMS or CDMA2000 to an unlicensed-radio access network connected to the conventional network.

In a non-limiting aspect, this object is achieved in an access network, a telecommunications network containing this access network and a method of handover in accordance with the present invention. Specifically the access network is adapted to communicate with a mobile terminal and a core network portion of a mobile telecommunications network, and comprises a plurality of local base stations each defining a mini-cell and adapted to communicate with mobile terminals located in a respective mini-cell over an unlicensed-radio interface; an access network controller adapted to communicate with the core network portion over a predetermined licensed mobile network interface and connected with the plurality of local base stations. Handover between a cell of the telecommunications network and the access network is facilitated by assigning a single common identifier associated with the access network controller to all the mini-cells. In this manner, the whole unlicensed-radio access network is identified by the same identifier in the remaining network. Handover to any mini-cell of the unlicensed-radio access network leads to the access network controller. The communication of this single identifier to the remaining network is thus relatively simple and quick.

At handover, the core network is adapted to address a handover request containing the common identifier to the access network controller. The access network controller is adapted to respond to a handover request from the core network by assigning a handover reference to the request and by setting up a communication path between a mobile station and the core network over the unlicensed-radio access network when a message containing the handover reference is received from the mobile station. Accordingly, assignment of any handover request to a particular access point or mini-cell is handled entirely by the access controller without the remaining network needing more information than the single identifier. The whole process is effectively transparent to the core network and the remaining access networks, which view the unlicensed access network as a single cell.

Depending on the type of mobile communications network the unlicensed-radio access network is connected to, the common identifier may identify only a single cell address. For some technologies, such as GSM, this identifier preferably also identifies a single channel frequency utilised by said local base stations and possibly also a single base station address.

The method in accordance with a non-limiting aspect resides essentially in the following steps: allocating a common identifier to all local base stations connected to the access network controller, each local base station communicating at least a part of the common identifier to a mobile station located within the associated mini-cell via the unlicensed-radio interface, the access network controller responding to a handover request message received from the core network portion by generating a handover reference and transmitting the handover reference as a handover acknowledgment message to the core network portion, the local base station receiving the handover reference from the mobile station and transmitting the handover reference to the access network controller across the fixed broadband network, the radio access controller setting up a communication path over the fixed broadband network with the local base station in response to the received handover reference.

Preferably the base station of the public licensed mobile network receives the common identifier from the mobile station, identifies the access network controller using the common identifier and generates a handover request message addressed to the access network controller via the switching control part.

In order to ensure that handover is triggered, even when signals received via an unlicensed-radio access network are weaker than those from adjacent public licensed mobile network cells, it is preferred that the mobile station, upon receipt of the common identifier, transmits a report to the base station adapted to trigger handover irrespective of other frequencies received by the mobile station.

BRIEF DESCRIPTION OF THE DRAWINGS

Further objects and advantages will become apparent from the following description of the preferred embodiments that are given by way of example with reference to the accompanying drawings. In the figures.

DETAILED DESCRIPTION

Figure 1:
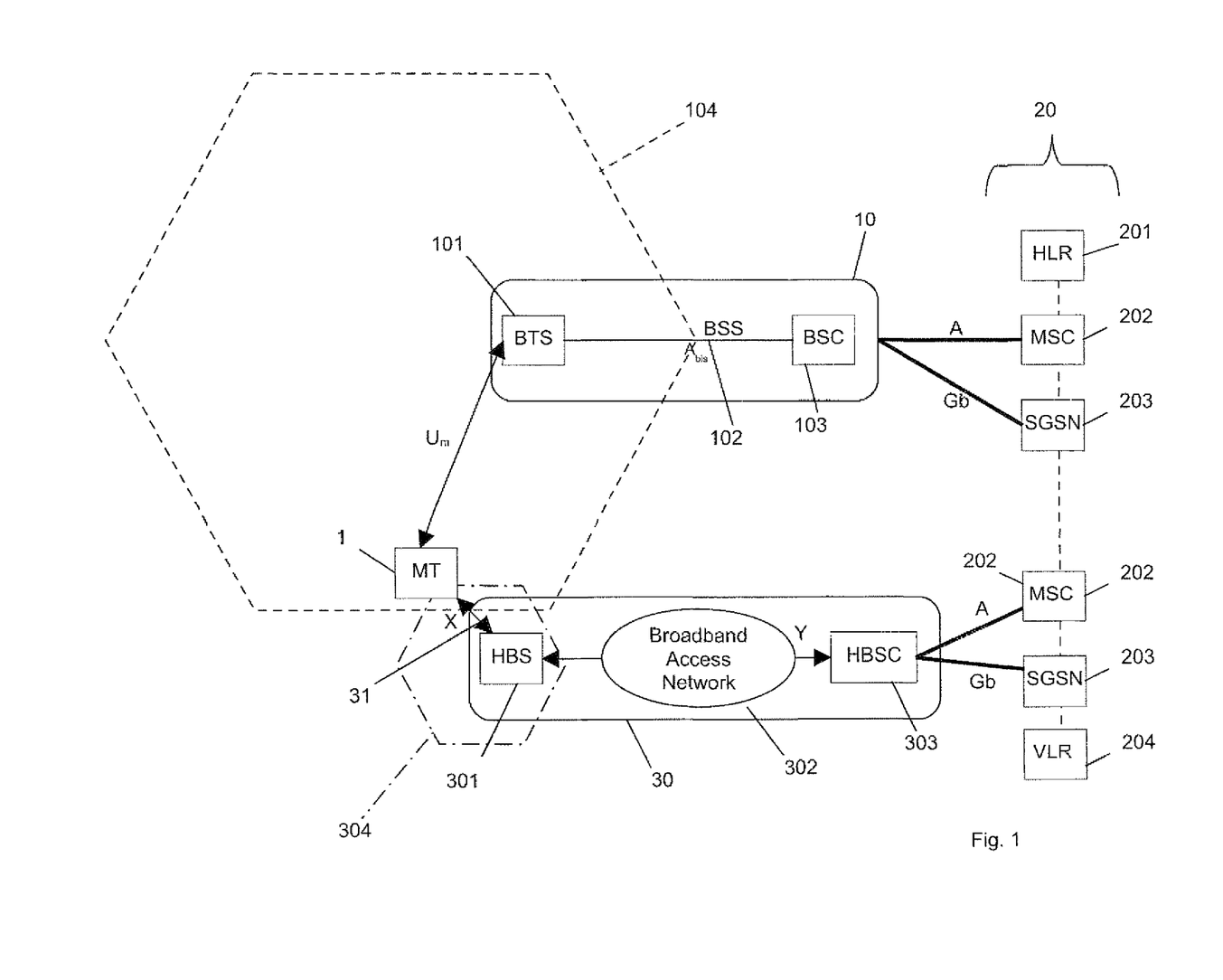
FIG. 1 schematically depicts parts of a GSM network with an unlicensed-radio access network, FIG. 2 schematically depicts the unlicensed-radio access network of FIG. 1.

FIG. 1 schematically depicts parts of a conventional GSM network. This network is essentially divided into a core network portion 20 and an access portion 10. The elements of the core network illustrated in the figure include the mobile switching centers or MSCs 202, associated home location register HLR 201 and visitor location register VLR 204. The function and structure of these conventional GSM architecture elements are known to those in the art and will not be described in further detail here. The core network also supports the General Packet Radio Service (GPRS), and to this end serving GPRS support nodes (SGSN) 203 are illustrated. Although not illustrated in the figure, it will be understood by those skilled in the art that the core network portion may include access to other mobile and fixed-line networks, such as ISDN and PSTN networks, packet and circuit switched packet data networks such as intranets, extranets and the Internet through one or more gateway nodes.

The access portion includes base station subsystems BSS 10, one of which is illustrated in FIG. 1, which communicate via defined fixed standard A and Gb interfaces with MSCs 202 and SGSNs 203, respectively in the core network portion 20. Each base station subsystem BSS 10 includes a base station controller BSC 103 which communicates with one or more base transceiver stations BTS 101 via the defined $A_{bis}$ air interface 102. The base transceiver stations 101 communicate with mobile terminals MT 1 over the GSM standard $U_m$ radio air interface. It will be understood that while the BTS 101 and BSC 103 are depicted as forming a single entity in the BSS 10, the BSC 103 is often separate from the BTSs 101 and may even be located at the mobile services switching centre MSC 202. The physical division depicted in FIG. 1 serves to distinguish between the parts of the network making up the access network portion 10 and those that form the core network portion 20.

In addition to the standard access network portion provided by the BSS's 10 the network depicted in FIG. 1 further includes a modified access network portion 30 shown in the lower half of the figure. Hereinafter this will be described as an unlicensed-radio access network portion.

The components making up this unlicensed-radio access network portion 30 also enable the mobile terminal 1 to access the GSM core network portion, and through this, other communication networks via an unlicensed-radio interface X, represented in FIG. 1 by the bi-directional arrow 31. By unlicensed-radio is meant any radio protocol that does not require the operator running the mobile network to have obtained a license from the appropriate regulatory body. In general, such unlicensed-radio technologies must be low power and thus of limited range compared to licensed mobile radio services. This means that the battery lifetime of mobile terminals will be greater. Moreover, because the range is low the unlicensed-radio may be a broadband radio, thus providing improved voice quality. The radio interface may utilise any suitable unlicensed-radio protocol, for example a wireless LAN protocol or Digital Enhanced Cordless Telecommunications (DECT). Preferably, however, Bluetooth radio is utilised, which has a high bandwidth and lower power consumption than conventional public mobile network radio.

The Bluetooth standard specifies a two-way digital radio link for short-range connections between different devices. Devices are equipped with a transceiver that transmits and receives in a frequency band around 2.45 GHz. This band is available globally with some variation of bandwidth depending on the country. In addition to data, up to three voice channels are available. Each device has a unique 48-bit address from the IEEE 802 standard. Built-in encryption and verification is also available.

The element of the unlicensed-radio access network portion 30 adapted to communicate across the Bluetooth interface is designated a local or home base station (HBS) 301. This element handles the radio link protocols with the mobile terminal MT 1 and contains radio transceivers that define a cell in a similar manner to the operation of a conventional GSM base station transceiver BTS 101. The home base station HBS 301 is controlled by a home base station controller HBSC 303, which communicates with a mobile service switching centre MSC 202 over the GSM standard A interface and also with a serving GPRS support node SGSN 203 over a standard Gb interface, if available in the core network portion. The interface between the home base station HBS 301 and its home base station controller HBSC 303 is designated a Y-interface. The home base station controller HBSC 303 provides the connection between the MSC 202 or SGSN 203 and mobile terminal 1. The joint function of the home base station HBS 301 and the home base station controller HBSC 303 emulates the operation of the BSS 10 towards the SGSN 203 and MSC 202. In other words, when viewed from the elements of the core network 20 such as the mobile service switching centre (MSC) 202 and the serving GPRS support node (SGSN) 203, the unlicensed-radio access network portion 30 constituted by the home base stations HBS 301 and the home base station controller HBSC 303 looks like a conventional access network portion 10.

The applications that run on the mobile terminal MT 1 on top of the public mobile network radio interfaces also run on top of Bluetooth radio between the mobile terminal 1 and the home base station HBS 301.

The interface between the home base station HBS 301 and the home base station controller HBSC 303 which is designated Y in FIG. 1 is preferably provided by a fixed link. The home base station 301 is intended to be a small device that a subscriber can purchase and install in a desired location such as the home or an office environment to obtain a fixed access to the mobile network. However, they could also be installed by operators in traffic hotspots. In order to reduce the installation costs on the part of the operator, the interface between the home base station 301 and the home base station controller 303, which is designated interface Y in FIG. 1 therefore preferably exploits an already existing connection provided by a fixed network 302. Preferably this network is a broadband packet network. Suitable networks might include those based on ADSL, Ethernet, LMDS, or the like. Home connections to such networks are increasingly available to subscribers. Although not shown in FIG. 1, the home base station HBS 301 will be connected to a network terminal giving access to the fixed network 302, while the home base station controller HBSC 303 may be connected to an edge router ER of the network 302 that also links the fixed network 302 to other networks such as intranets and the internet. IP can be used for communication between the home base station HBS 301 and home base station controller HBSC 303 over the fixed network 302 to render the transport of data independent of the network type. The link between the home base station HBS 301 and the home base station controller HBSC 303 is preferably always open, so that this connection is always available without the need for reserving a channel. While the fixed network 302 is preferably an IP-based network, ATM-based networks could also be used. In particular when DSL technologies are used in this network, they could be used directly on top of the ATM layer, since they are based on ATM. Naturally, an ATM based network could also be used to transport IP, serving as a base layer.

The home base station HBS 301 is installed by plugging it in to a port of a suitable modem, such as an ADSL or CATV modem, to access the fixed network 302. The port is in contact with an intranet that is either bridged or routed on the IP level. Thus standard protocols, such as IP, DHCP, DNS and the like are used. The home base station HBS 301 connected to the modem utilises these standard protocols and functions to ascertain to which home base station controller HBSC 303 it should connect, and also to establish a connection with this home base station controller HBSC 303.

The base stations 101 and 301 in both the conventional access network 10 portion and the unlicensed-radio access network portion 30 define a coverage area depicted in FIG. 1 by hexagonal cells 104, 304. While the relative dimensions of these cells are not necessarily accurate in the figure, it is nevertheless clear that the coverage of a conventional BTS 101 is far greater than the comparatively low power HBS 301. For this reason, and because an HBS 301 can be installed wherever there is a port to the fixed broadband network connected to an HBSC 303, one or more mini-cells 304 generated by HBS's 301 may be located inside the cell 104 of a conventional BTS 101.

Figure 2:
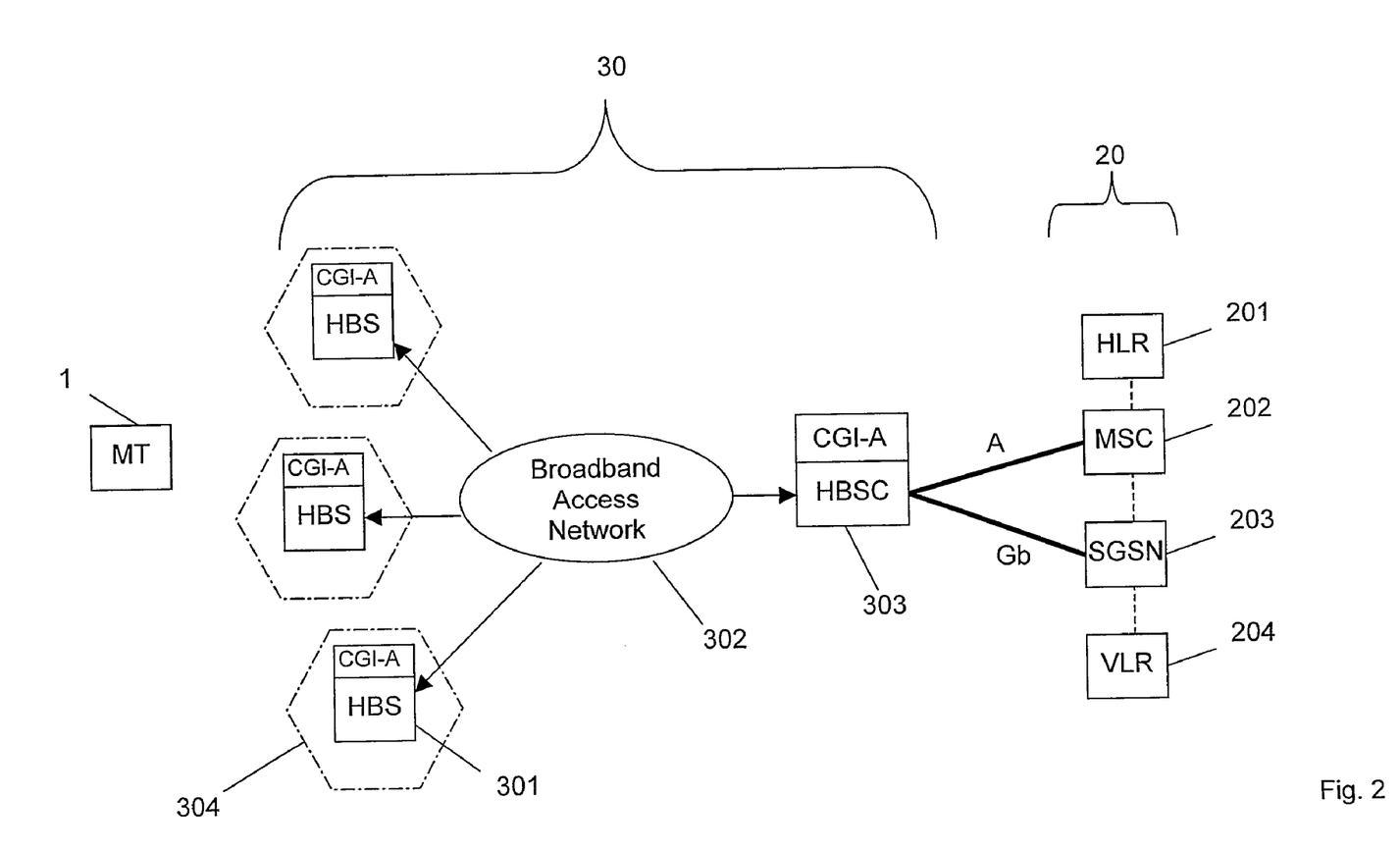

In a conventional GSM network, handover of calls between adjacent cells is enabled by informing the currently connected access network 10 and the core network portion 20 of the identification of neighbouring cells by means of a cell global identifier CGI, which contains the mobile country code, mobile network code and a location area code, and also information about which BSC 103 and MSC 202 (or SGSN 203, if available in the network) controls these cells. The BSC 103 must be able to communicate the absolute radio frequency channel numbers (ARFCN) allocated to all neighbouring cells to a mobile terminal 1 connected to it so that the mobile terminal 1 can measure the associated frequencies and report back the strongest frequencies. In addition to the channel number ARFCN, this message also includes a base station identity code BSIC that is unique in the area to the base station transmitting on the identified channel frequency. With the introduction of a large number of mini-cells 304 resulting from the installation of an unlicensed-radio access network 30 this kind of operation and maintenance activity becomes very complex and cumbersome, particularly as the location of the mini-cells may change over time. FIG. 2 illustrates how this installation activity is greatly reduced and facilitated in accordance with one or more non-limiting aspects of the present invention.

FIG. 2 illustrates an unlicensed-radio access network as shown in FIG. 1 with the core network portion 20 likewise illustrated in FIG. 1. Like reference numerals have been used for like parts in both figures, so a renewed description of these will not be repeated. In the unlicensed-radio access network 30, the home base station controller HBSC 303 controls several home base stations HBS 301. This is exemplified in FIG. 2 by the depiction of three HBS 301. The home base stations HBS 301, and thus the mini-cell 304 generated thereby in the same access network 30 may be located close to one another or at a great distance from one another depending on the available access to the broadband access network 203. The home base station controller HBSC 303 holds a data structure representing a logical view of these home base stations HBS 301. This data structure is updated either automatically or dynamically as home base stations HBS 301 connect to the home base station controller HBSC 303. A home base station HBS 301 is allocated an IP address on the fixed network 302. The home base station controller HBSC 303 will naturally also have an IP address on the fixed network 302. This address is also known by the home base stations HBS 301.

However, for the purposes of identifying the mini-cells 304 to enable handover, rather than allocating a unique cell identifier, base station identifier and frequency channel number to each mini-cell 304, all mini-cells 304 in the same unlicensed-radio access network are identified to the GSM network by the same identification. In effect, the whole unlicensed-radio access network 30 or rather the home base station controller HBSC 303 controlling this access network is assigned a single cell identification. This identification is then distributed in the network by manual operation and maintenance procedures on installation so that the core network portion and the relevant base station subsystems BSS 10 controlling cells neighbouring one or more mini-cells can access this identification. The cell identification is equivalent to the cell global identifier CGI used in a conventional GSM network and also includes a unique, single Location Area assigned to the access network 30. This is illustrated schematically in FIG. 2 by the assignment to the home base station controller 303 of a cell identifier CGI-A.

In addition to the cell identifier CGI, the unlicensed-radio access network has a single base station identifier BSIC and absolute radio frequency channel number ARFCN. The base station identifier BSIC and absolute radio frequency channel number ARFCN are communicated by each home base station HBS 301 in response to a measurement report request from the mobile station MS 1, and consequently an indication of these identifiers will be included in any measurement report sent by a mobile station 1 to its connected base station controller 103 when it established a connection with a home base station HBS 301 of an unlicensed-radio access network 30. This naturally implies that the absolute radio frequency channel number ARFCN of the unlicensed-radio access network is included in the measurement list sent by the base station subssystem BSS 10 connected to the mobile station 1. The combination of the base station identifier BSIC and absolute radio frequency channel number ARFCN should thus serve to indicate the specific cell identifier CGI allocated to the unlicensed-radio access network 30. If more than one unlicensed-radio access networks are present, each will have a single associated cell identifier CGI and thus a single combination of base station identifier BSIC and absolute radio frequency channel number ARFCN.

On installation of the unlicensed-radio access network, the single cell identifier CGI is communicated to all base station subsystems BSS 10. These elements will also be informed of the associated base station identification code BSIC and absolute radio frequency channel number ARFCN. This permits base station subsystem BSS 10 to include the frequency emitted by the neighbouring home base station in the list of frequencies communicated to a mobile station within its own cell 104 that are to be measured and reported back on to determine whether handover is required and to which cell. The mobile services switching centers MSC 202 and/or GPRS support nodes SGSN 203 will likewise be informed of the single cell identifier.

Figure 3:
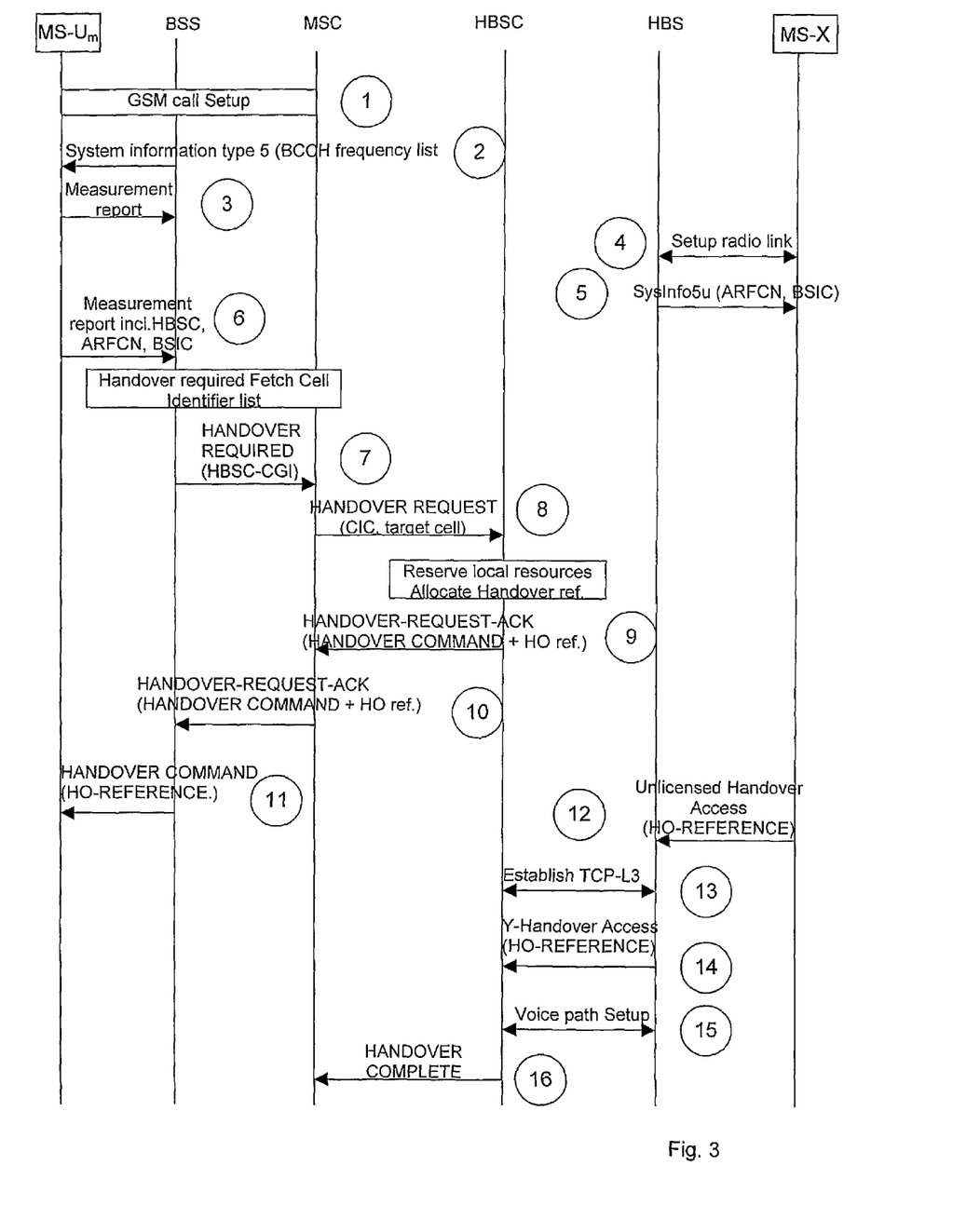
FIG. 3 illustrates the signalling sequence for handover of a call from a public mobile network, such as GSM to an unlicensed-radio access network.

FIG. 3 illustrates the signalling sequence conducted between a mobile terminal, a base station subsystem BSS 10, the mobile services switching centre MSC 202, the home base station controller HBSC 303 and the home base station HBS 301 when an active call conducted by the mobile station 1 via the conventional base station subsystem BSS 10 is handed over to a home base station HBS 301 of the unlicensed-radio access network.

In FIG. 3 the various elements involved in the signalling are shown at the top of the drawing. The mobile station MS is indicated twice on either side of the figure. The left hand mobile station MS Um represents the standard GSM Um interface and the right-hand mobile station MS X represents the unlicensed radio interface, or X-interface, of the same mobile station. Referring now to event 1 of FIG. 3, it is assumed that a GSM call has been set up between a mobile station MS and a base station subsystem BSS via the standard Um interface. At event 2, the base station subsystem BSS transmits system information to the mobile station Ms including the list of frequencies the mobile station MS should measure for handover purposes. This measurement list includes the absolute radio frequency channel number ARFCN assigned to the unlicensed-radio access network. A measurement report on the frequencies listed is sent from the mobile station MS to the base station subsystem BSS at event 3. At event 4 it is assumed that the mobile station has wandered into the coverage area or mini-cell of a home base station HBS of an unlicensed radio access network. The mobile station sets up a radio link with the HBS via the unlicensed radio interface X. The mobile station MS is then able to receive system information from the home base station HBS including the base station identifier code BSIC and the absolute radio frequency channel number ARFCN at event 5. The BSIC and ARFCN values are then included in the next measurement report sent to the base station subsystem BSS at event 6. At event 7 the base station subsystem determines that the channel number associated with the unlicensed radio access network is reported to have the strongest signal in the measurement report and consequently triggers handover by sending a HANDOVER-REQUIRED message (GSM 08.08) to the mobile services switching center MCS. Included in this message is the cell identifier CGI that identifies the home base station controller HBSC controlling the unlicensed radio access network concerned. At event 8, the mobile services switching center MSC sends the HANDOVER-REQUIRED message to the home base station controller HBSC. In addition to the cell identifier (COI), this message now also includes a circuit identification code (CIC) that will be used in the A-interface if handover is successful. On receipt of this message, the home base station controller HBSC reserves the necessary local resources and assigns a handover reference number (HO reference) to this handover. It should be noted that the home base station controller HBSC does not know at this stage which home base station HBS and associated mini-cell this handover request concerns. At event 9 a the home base station controller HBSC creates the required HANDOVER COMMAND message concerning the radio resource layer (RR) containing the handover reference number (HO reference). This HANDOVER COMMAND message is then included in a handover acknowledgement message (HANDOVER-REQUEST-ACK) sent to the mobile services switching center MSC. The acknowledgement message is then sent to the base station subsystem BSS at event 10 and the HANDOVER COMMAND message transmitted to the mobile station MS at event 11.

The mobile station then sets up the necessary connection toward the home base station controller HBSC via the home base station HBS. This is achieved by the transmission of an appropriate message at event 12, which is called "unlicensed handover access". This message includes the handover reference number (HO reference). After setting up a connection across the fixed broadband network at event 13, the home base station then transmits at event 14 the handover access message, which includes the handover reference number (HO reference) and additionally all other data necessary for the connection, such as the IP related data for the connection across the fixed broadband network 302. This may include, for example, the IP-address and UDP port of the home base station HBS to which the voice or data packets should be sent.

When the home base station controller HBSC receives this message it is able to associate it with the previous handover request using the handover reference number (HO reference). The home base station controller HBSC then uses the CIC value previously communicated to connect the allocated circuit via the A-interface with the IP resources. Similarly, the home base station controller HBSC sends the necessary IP information, such as the voice IP address and UDP-port, to the home base station HBS to set up a bidirectional voice path at event 15. After this the home base station controller HBSC sends a HANDOVER COMPLETE message to the mobile services switching center MSC in acknowledgement of successful handover. The mobile services switching center MSC can then release the old voice path used in the base station subsystem BSS.

It will be understood by those skilled in the art that handover from a GSM network to an unlicensed-radio access network the communication channel will be activated only after the mobile station has transmitted the handover reference to the home base station controller. This differs from handover between two GSM cells or from an unlicensed radio access network to a GSM cell wherein the channel is activated when the resources are reserved upon receipt of a handover request and prior to the acknowedgement of the handover request.

The determination at event 7 by the base station subsystem BSS that the signal strength of the frequency broadcast by the home base station HBS is stronger than all other frequencies broadcast by neighbouring cells is the result of a controlled weighting in the mobile station. The home base stations HBS 301 typically transmit at a much lower power than the base transceiver stations BTS 101 of a convention GSM access network. For this reason, it is unlikely that the signal strength of a frequency transmitted by a home base station will exceed that of a neighbouring (or encompassing) GSM cell. However, in the GSM network handover is conventionally triggered when the signal strength received by a mobile station from an active or connected base transceiver station BTS 101 is exceeded by that emitted by another base transceiver station BTS. In order to permit the triggering of handover in this conventional manner and thus obviate the need to modify the GSM access networks 10, the mobile station MS 1 capable of supporting unlicensed-radio communication is modified to falsify the measurement report when an unlicensed radio link can be set up with a home base station 301 over an X-interface and the mobile station is able to receive the channel number and base station identifier code (ARFCN, BSIC). This may be achieved by weighting the measurements before reporting these, such that the channel number associated with the unlicensed-radio access network is given a higher measurement value than other channel numbers, including the active channel it is actually using.

Alternatively, if the base station subsystem BSS 10 and specifically the base station controller BSC 103 is available for some modification, it could be adapted to despatch an order to the mobile station 1 on how to report the frequency measurements. In this way, if the mobile station supports communication with one or more unlicensed radio access networks, the order could specify that the mobile station include only this frequency in the measurement report or that this specific frequency be reported with a predetermined strength when a radio link has been established.

The unlicensed-radio access network 30 described with reference to the figures resembles a conventional access network in that there are a plurality of base station elements with their own functionality and a controller connected to these base stations. However, the present invention is not limited to this structure. In an alternative embodiment the same operation is achieved with an essentially transparent access point, that is existing access points to a broadband network, by transferring the functionality of the home base stations to the home base station controller and/or the mobile station. In other words, the mobile station communicates directly with the home base station controller HBSC 303 over an unlicensed-radio interface and the broadband network via the access point. As far as signalling is concerned, this would mean that the events 5 and 12 to 15 illustrated in FIG. 3 denoting communication between the mobile station MS and the home base station HBS or the home base station HBS and the home base station controller HBSC are replaced by a direct communication between the mobile station MS and the home base station controller HBSC, transparently through the home base station HBS. The home base station HBS thus serves simply as a transparent access point. The radio link setup at event 4 in FIG. 3 thus also includes the setting up of a connection across the broadband network, so that the home base station controller HBSC is aware of the presence of the mobile station and is able to send the system information at event 5.

The above detailed description of handover has referred only to GSM networks as a conventional public mobile network. It will be understood by those skilled in the art, however, that handover from other conventional public mobile networks, such as UMTS or CDMA2000, to an unlicensed-radio access network can be handled in an analogous manner. In all cases, the allocation of a single cell identifier for a whole unlicensed-radio access network and the subsequent handling within the unlicensed-radio access network would be applicable for other technologies.

The invention claimed is:

1. An access network adapted to communicate with a mobile station and a core network portion of a public mobile network, said access network comprising:
    a plurality of local base stations each defining a mini-cell and adapted to communicate with mobile stations located in said mini-cell over an unlicensed-radio interface; and
    an access network controller adapted to communicate with said core network portion over a predetermined mobile network interface and connected to said plurality of local base stations,
    wherein all said mini-cells are assigned a common identifier associated with said access network controller, said common identifier identifying a single cell address known to said core network, said single cell address being a cell address of said public mobile network assigned to said access network such that from a perspective of said core network, said access network is a single cell of said public mobile network, and wherein said access network controller is adapted to receive a handover request containing said common identifier from said core network, to respond to said handover request by assigning a handover reference to said request, and to setup a communication path between said mobile station and said core network when a message containing said handover reference is received from said mobile station.

2. The access network of 1, wherein said plurality of local base stations are adapted to communicate said common identifier to said mobile station.

3. The access network of 1, wherein said common identifier identifies a channel frequency utilized by said plurality of local base stations.

4. The access network of 1, wherein said common identifier identifies a base station address common to all of said plurality of local base stations.

5. The access network of 1, further comprising a broadband network connecting said plurality of local base stations with said access network controller.

6. The access network of claim 1, wherein said common identifier includes an allocated frequency channel identifier which identifies a frequency channel of said public mobile network allocated to said access network such that from said perspective of said core network, said frequency channel is allocated to said single cell of said public mobile network, wherein said allocated frequency channel identifier is included in a measurement list of frequency channels identifiers provided to said mobile station by a base station subsystem of said public mobile network, said measurement list identifying frequency channel(s) for said mobile station to measure, wherein each of said plurality of local base stations is adapted to provide said allocated frequency channel identifier to said mobile station when a radio link with said mobile station is established, said radio link being established over said unlicensed-radio interface, and wherein an indication of said allocated frequency channel identifier is included in a measurement report sent from said mobile station to said core network.

7. The access network of claim 6, wherein said common identifier further includes a base station identifier of said public mobile network assigned to said access network such that from said perspective of said core network, said base station identifier corresponds to said single cell of said public mobile network, wherein each of said plurality of local base stations is further adapted to provide said base station identifier to said mobile station when said radio link with said mobile station is established, and wherein an indication of said base station identifier is further included in said measurement report sent from said mobile station to said core network.

8. A method for handing over a communication with a mobile station from a cell of a public mobile network to a mini-cell of an unlicensed-radio access network connected to said public mobile network, said public mobile network comprising an access portion including a base station defining said cell and a core network portion including a switching control part connected to said access portion, said unlicensed-radio access network comprising a plurality of local base stations each defining a mini-cell and adapted to communicate with said mobile station via an unlicensed-radio interface and an access network controller connected to said plurality of local base stations and adapted to communicate with said core network portion of said public mobile network, said method comprising:

allocating a common identifier to all mini-cells associated with said access network controller said common identifier identifying a single cell address known to said core network, said single cell address being a cell address of said public mobile network assigned to said access network such that from a perspective of said core network, said access network is a single cell of said public mobile network;

said access network controller responding to a handover request message containing said common identifier received from said core network portion by generating a handover reference and transmitting said handover reference in a handover acknowledgment message to said core network portion; and said access network controller receiving said handover reference from said mobile station via said local base station and setting up a communication path between said mobile station and said core network in response to said received handover reference.

9. The method of 8, further comprising:

said access portion of said public mobile network receiving said common identifier from said mobile station, identifying said access network controller using said common identifier and generating said handover request message addressed to said access network controller via said switching control part.

10. The method of 8, further comprising:

said mobile station, upon receipt of said common identifier, transmitting a report to said access portion adapted to trigger handover irrespective of other frequencies received by said mobile station.

11. The method of claim 8, wherein said common identifier includes an allocated frequency channel identifier which identifies a frequency channel of said public mobile network allocated to said access network such that from said perspective of said core network, said frequency channel is allocated to said single cell of said public mobile network, said method further comprising:

said mobile station receiving a measurement list of frequency channel identifiers from said base station of said access portion, said measurement list including said allocated frequency channel identifier;

said local base station corresponding to said mini-cell of said access network establishing a radio link with said mobile station over said unlicensed-radio interface;

said local base station providing said allocated frequency channel identifier to said mobile station using said radio link; and said mobile station sending a measurement report to said core network portion, said measurement report including an indication of said allocated frequency channel identifier.

12. The method of claim 11, wherein said common identifier further includes a base station identifier of said public mobile network assigned to said access network such that from said perspective of said core network, said base station identifier corresponds to said single cell of said public mobile network, said method further comprising:

said local base station further providing said base station identifier to said mobile station using said radio link; and said mobile station further including an indication of said base station identifier in said measurement report.

13. An access network controller for use in an access network adapted to communicate with a mobile station and a core network portion of a public licensed mobile network, said access network controller being adapted to communicate with said core network portion over a predetermined mobile network interface and being connected to a plurality of access points, each defining a mini-cell, wherein said access network controller is adapted to communicate with said mobile station located in a respective mini-cell of an access point via an unlicensed-radio interface between said mobile station and said access point, wherein said access network controller is adapted to receive a handover request containing a common identifier from said core network, said common identifier being associated with said access network controller and assigned to all mini-cells connected with said access network controller, said common identifier identifying a single cell address known to said core network, said single cell address being a cell address of said public licensed mobile network assigned to said access network such that from a perspective of said core network portion, said access network is a single cell of said public licensed mobile network;

to respond to said handover request by assigning a handover reference to said handover request; and to set up a communication path between said mobile station and said core network when a message containing said handover reference is received from said mobile station.

14. The access network controller of 13, wherein said access network controller is connected to said plurality of access points via a broadband network.

15. The access network controller of claim 13, wherein said common identifier includes an allocated frequency channel identifier which identifies a frequency channel of said public licensed mobile network allocated to said access network such that from said perspective of said core network portion, said frequency channel is allocated to said single cell of said public licensed mobile network, and wherein said allocated frequency channel identifier is included in a measurement list of frequency channels identifiers provided to said mobile station by a base station subsystem of said public mobile network, said measurement list identifying frequency channel(s) for said mobile station to measure.

16. The access network controller of claim 15, wherein said common identifier further includes a base station identifier of said public licensed mobile network assigned to said access network such that from said perspective of said core network portion, said base station identifier corresponds to said single cell of said public licensed mobile network.

17. In an access network controller forming part of an unlicensed radio access network, said access network controller being connected to a plurality of access points each defining a mini-cell and being adapted to communicate with mobile stations located in said mini-cells via said access points and to communicate with a core network portion of a public licensed mobile network, a method of handling handover of a communication with a mobile station from a cell of said public licensed mobile network to a mini-cell of said unlicensed-radio access network, said method comprising:

said access network controller receiving a handover request message from said core network portion, said handover request message containing a common identifier for identifying all mini-cells associated with said access network controller, said common identifier identifying single cell address known to said core network portion, said single cell address being a cell address of said public licensed mobile network assigned to said access network such that from a perspective of said core network portion, said access network is a single cell of said public licensed mobile network;

said access network controller responding to said handover request message by generating a handover reference and transmitting said handover reference in a handover acknowledgment message to said core network;

said access network controller receiving said handover reference from said mobile station via an access point corresponding to said mini-cell; and said access network controller setting up a communication path between said mobile station and said core network in response to said received handover reference.

18. The method of claim 17, wherein said common identifier includes an allocated frequency channel identifier which identifies a frequency channel of said public licensed mobile network allocated to said access network such that from said perspective of said core network portion, said frequency channel is allocated to said single cell of said public licensed mobile network, and wherein said allocated frequency channel identifier is included in a measurement list of frequency channels identifiers provided to said mobile station by a base station subsystem of said public mobile network, said measurement list identifying frequency channel(s) for said mobile station to measure.

19. The method of claim 18, wherein said common identifier further includes a base station identifier of said public licensed mobile network assigned to said access network such that from said perspective of said core network portion, said base station identifier corresponds to said single cell of said public licensed mobile network.

* * * * *

UNITED STATES PATENT AND TRADEMARK OFFICE
CERTIFICATE OF CORRECTION

PATENT NO. : 8,275,376 B2
APPLICATION NO. : 10/588658
DATED : September 25, 2012
INVENTOR(S) : Vikberg et al.

It is certified that error appears in the above-identified patent and that said Letters Patent is hereby corrected as shown below:

In the Drawings:

In Fig. 3, Sheet 3 of 3, below "MSC", delete "(BCCH frequency list" and insert -- (BCCH frequency list) --, therefor.

In the Specifications:

In Column 1, Line 7, delete "PCT/EP2005/001115 filed 6 Feb. 2005," and insert -- PCT/EP2004/001115 filed 6 Feb. 2004, --, therefor.

In Column 2, Line 21, delete "and," and insert -- and --, therefor.

In Column 8, Line 56, delete "(COI)," and insert -- (CGI), --, therefor.

In Column 8, Line 64, delete "9 a" and insert -- 9 --, therefor.

In Column 9, Line 45, delete "acknowedgement" and insert -- acknowledgement --, therefor.

In the Claims:

In Column 11, Line 16, in Claim 2, delete "of" and insert -- of claim --, therefor.

In Column 11, Line 19, in Claim 3, delete "of" and insert -- of claim --, therefor.

In Column 11, Line 22, in Claim 4, delete "of" and insert -- of claim --, therefor.

In Column 11, Line 25, in Claim 5, delete "of" and insert -- of claim --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,275,376 B2

In Column 12, Line 29, in Claim 9, delete "of" and insert -- of claim --, therefor.

In Column 12, Line 36, in Claim 10, delete "of" and insert -- of claim --, therefor.

In Column 13, Line 34, in Claim 14, delete "of" and insert -- of claim --, therefor.

In Column 14, Line 18, in Claim 17, delete "single" and insert -- a single --, therefor.

In Column 14, Line 27, in Claim 17, delete "network;" and insert -- network portion; --, therefor.